United States Patent [19]
McNeill

[11] 3,830,517
[45] Aug. 20, 1974

[54] MOTORCYCLE REAR SPRING SUSPENSION DEVICE

[76] Inventor: Neill E. McNeill, 10900 Burbank Blvd., North Hollywood, Calif. 91601

[22] Filed: Nov. 16, 1973

[21] Appl. No.: 416,572

[52] U.S. Cl.............................. 280/124 R, 267/169
[51] Int. Cl............................................. B60g 15/02
[58] Field of Search......... 280/124 R; 267/60, 61 R, 267/169, 170

[56] References Cited
UNITED STATES PATENTS
2,155,521 4/1939 Zavarella ......................... 267/61 R
3,411,806 11/1968 Bellairs ........................... 280/124 R

*Primary Examiner*—Philip Goodman
*Assistant Examiner*—John A. Carroll
*Attorney, Agent, or Firm*—John Joseph Hall

[57] ABSTRACT

A motorcycle rear spring suspension device having guide pin members rigidly attached to a bearing block at their inner ends as a safety factor and mounted at their outer ends in guide pin holders having a lip on two opposite sides with a square center portion to prevent loosening of the holder as a safety factor.

4 Claims, 7 Drawing Figures

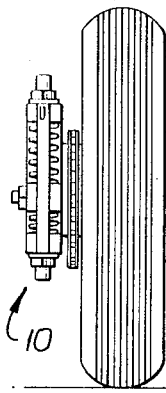
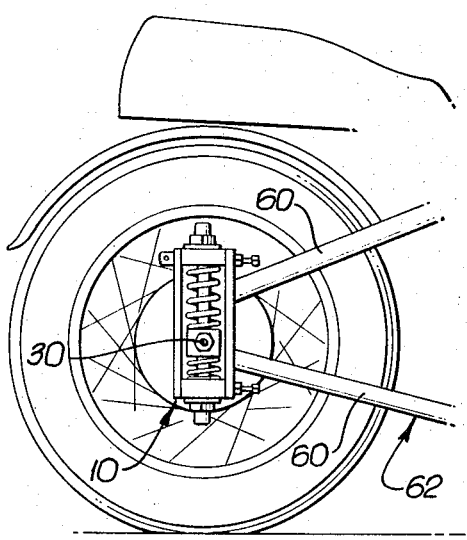
FIG. 2.  FIG. 1.
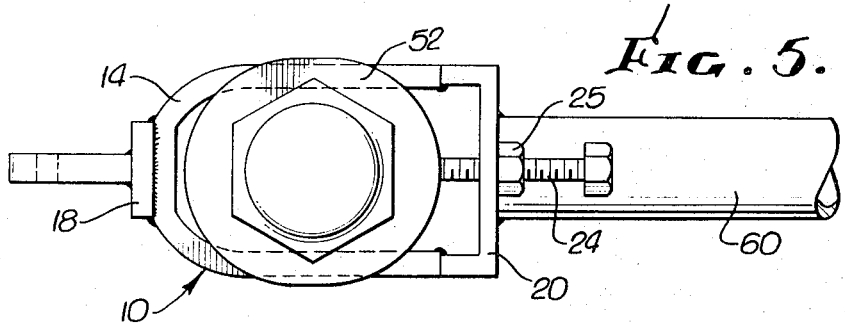
FIG. 5.
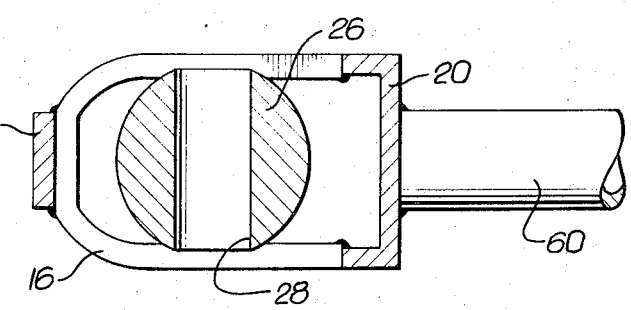
FIG. 6.
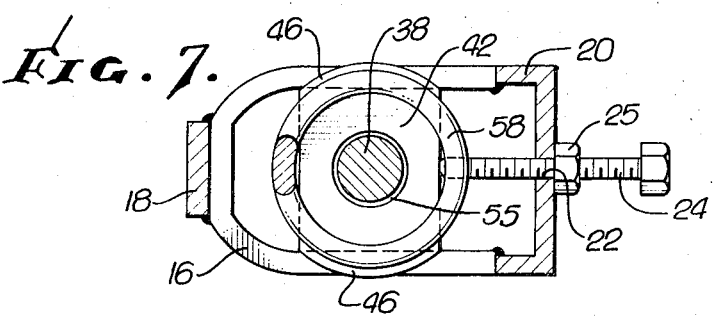
FIG. 7.

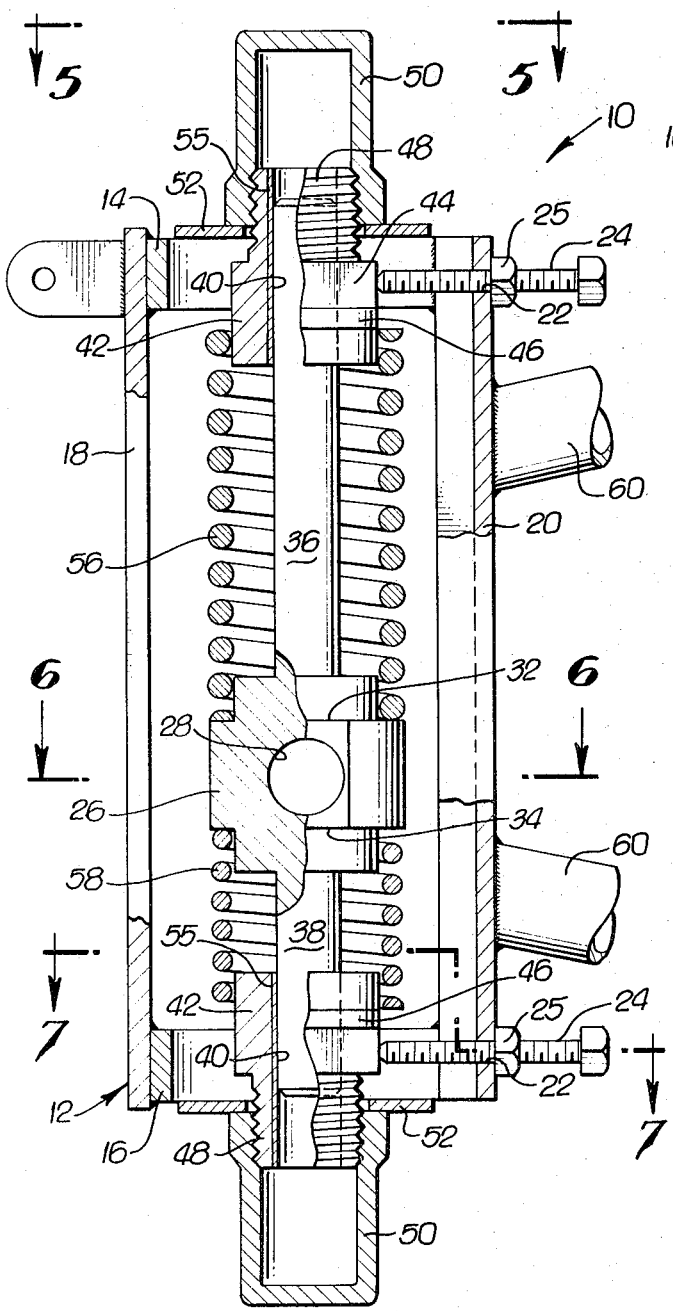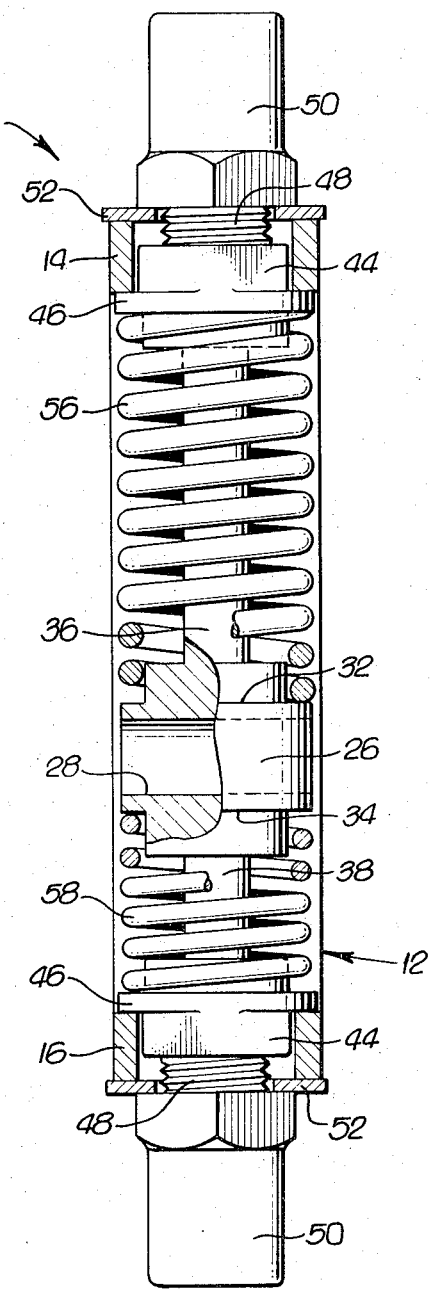

MOTORCYCLE REAR SPRING SUSPENSION DEVICE

BACKGROUND OF THE INVENTION

1. Field of the Invention

This invention relates to a new and improved type of motorcycle rear spring suspension device which provides increased safety by using guide pins rigidly attached to a bearing block and a guide pin holder having a square center portion with a lip thereon.

2. Prior Art

Although various types of suspension spring devices have been known in the prior art, applicant knows of no prior art showing the particular structures and combination of parts of the motorcycle rear spring suspension device described and claimed herein.

SUMMARY OF THE INVENTION

The invention provides a motorcycle rear spring suspension device that incorporates several safety features. The guide pins of conventional spring suspension devices are usually threaded into a bearing block or similar device and are subject to coming loose and off while the vehicle is in motion. The invention provides guide pins that are welded or otherwise rigidly attached to the bearing block to make it impossible for the guide pins to loosen and come out while the motorcycle is moving.

Moreover, the springs of the invention are mounted in a housing having top and bottom U-shaped brackets by means of guide pin holders formed with a square middle portion having a lip on two opposite sides. The square portion and lip of the guide pin holders maintains them in position even though the guide pin retainer nuts for the device should loosen and come off while the motorcycle is in motion.

It is, therefore, an object of this invention to provide a motorcycle rear spring suspension device which effectively absorbs upward road shocks while the motorcycle is in motion.

Another object of this invention is to provide a motorcycle rear spring suspension device with safety means to prevent the springs from coming apart from the device while the motorcycle is in motion.

A further object of this invention is to provide a motorcycle rear spring suspension device which has a safety means for retaining guide pin members in position even though the retaining nut members are loosened and may be off of the device.

These and other objects will be more readily understood by reference to the following description and accompanying drawings, in which FIG. 1 is a side elevational view of an embodiment of the invention in position on the rear wheel of a motorcycle shown in fragmentary section.

FIG. 2 is a rear elevational view of an embodiment of the invention mounted on each side of the rear wheel of a motorcycle.

FIG. 3 is a side elevational view of an embodiment of the invention showing the details of construction.

FIG. 4 is a section taken on line 4—4 of FIG. 3.
FIG. 5 is a section taken on line 5—5 of FIG. 3.
FIG. 6 is a section taken on line 6—6 of FIG. 3.
FIG. 7 is a section taken on line 7—7 of FIG. 3.

The motorcycle rear spring suspension device 10 has a housing 12 having a top U-shaped bracket 14 and a bottom U-shaped bracket 16 connected at each end by longitudinal bars 18 and 20.

Longitudinal bar 20 has threaded openings 22 which receive adjustment bolts 24 with nuts 25 thereon.

The spring suspension device 10 has a bearing block member 26 with a bore 28 through its center to receive the rear axle 30 of a motorcycle. Bearing block member 26 has a reduced top portion forming a top shoulder 32 and a reduced bottom portion forming a bottom shoulder 34.

A top guide pin member 36 is rigidly attached at its lower end by welding or other suitable means to top shoulder 32 and a bottom guide pin member 38 is rigidly attached at its upper end by welding or other suitable means to bottom shoulder 34.

The top end of top guide pin member 36 and the bottom end of bottom guide pin member 38 each fit into an opening 40 of a top guide pin holder 42, and an opening 40 of a bottom guide pin holder 42.

Guide pin holder 42 has a square center outer portion 44 having a lip 46 formed on two opposite sides. The lip 46 of each guide pin holder 42 engages the top and bottom U-shaped brackets 14 and 16 of housing 12.

The outer portion 48 of guide pin holder 42 is threaded to receive a retainer nut 50 and a washer 52. The inner portion of guide pin holder 42 is formed into a shoulder 54.

A bronze bushing 55 is pressed into the inner circumference of guide pin holder 42 to minimize wear to the guide pin members 36 and 38, as well as to the holder 42.

A top spring 56 is placed around top guide pin member 36 and a bottom spring 58 is placed around bottom guide pin member 38. Preferably, the top spring 56 is longer than the bottom spring 58 because a longer top spring 56 absorbs upward road shocks more effectively. The bottom spring 58 absorbs the rider's weight and serves as a return for the top spring 56.

In operation, the motorcycle rear suspension spring device 10 is mounted on each side of the rear bars 60 of a motorcycle frame 62 with the various component parts assembled as shown in the drawings. Lips 46 of guide pin holders 42 engage the top and bottom U-shaped brackets 14 and 16, thereby preventing any dislodging of the guide pin members 36 and 38. Even if the retainer nut 50 should become loosened and fall off, the spring tension of top and bottom springs 56 and 58 will maintain the guide pin holders 42 in position.

Moreover, the square center outer portion 44 of guide pin holders 42 prevent any dislodging of the top or bottom springs 56 and 58 by any movement or vibration of the guide pin members 36 and 38.

In this manner, road shocks while a motorcycle is in motion are effectively absorbed by the device 10 with built in safety factors due to the construction and arrangement of the component parts of the device 10.

Although I have described my invention in detail with reference to the accompanying drawings illustrating a preferred embodiment of my invention, it is understood that numerous changes in the details of construction and arrangement of parts may be made without departing from the spirit and scope of the invention as hereinafter claimed.

I claim:

1. A motorcycle rear spring suspension device, comprising:

a housing having a top U-shaped bracket member and a bottom U-shaped bracket member connected at each end by longitudinal bar members;

a bearing block member having a bore there through;

a top guide pin member rigidly attached to the top portion of said bearing block member;

a bottom guide pin member rigidly attached to the bottom portion of said bearing block member;

a top and a bottom guide pin holder for the respective outer ends of said top and bottom guide pin members, said guide pin holders having a square center outer portion having a lip on two opposite sides engaging each of said U-shaped brackets, and having a threaded outer portion to receive a retainer nut member;

a top spring member placed around said top guide pin member and between said top guide pin holder and said bearing block member; and a bottom spring member placed around said bottom guide pin member and between said bottom guide pin holder and said bearing block member, whereby dislodging of said top and bottom springs is prevented while said device is absorbing road shocks when said motorcycle is in motion.

2. A motorcycle rear spring suspension device according to claim 1 in which the housing is provided with adjustment bolt members.

3. A motorcycle rear spring suspension device according to claim 1 in which the top spring member is longer than the bottom spring member.

4. In a motorcycle rear spring suspension device of the type having a bearing block with top and bottom guide pin members and top and bottom springs, the improvement comprising:

a frame with top and bottom U-shaped brackets connected by longitudinal bar members;

a top guide pin holder with an opening receiving the outer end of said top guide pin member; and a bottom guide pin holder having an opening receiving the outer end of said bottom guide pin member;

said top and bottom guide pin holders each having a square center portion with a lip on two opposite sides engaging respectively said top and bottom U-shaped brackets.

* * * * *